United States Patent [19]

Elmes et al.

[11] 4,339,531

[45] Jul. 13, 1982

[54] PHOTOGRAPHIC FILM BASES

[75] Inventors: Terence D. J. Elmes, Hatfield; Patrick T. McGrail, Hitchin, both of England

[73] Assignee: Imperial Chemical Industries Limited, London, England

[21] Appl. No.: 237,775

[22] Filed: Feb. 24, 1981

[30] Foreign Application Priority Data

Mar. 12, 1980 [GB] United Kingdom ................ 8008392

[51] Int. Cl.$^3$ .......................... B32B 27/06; G03C 1/78

[52] U.S. Cl. .................................... 430/535; 428/483; 428/527; 428/935; 428/536; 427/393.5; 427/40; 427/41

[58] Field of Search ............... 430/534, 535, 536, 527, 430/528, 529, 514, 62, 64, 935; 428/483, 374; 427/393.5, 40, 41; 260/29.6 TA, 29.6 H, 29.6 R

[56] References Cited

U.S. PATENT DOCUMENTS

| | | | |
|---|---|---|---|
| 3,090,704 | 5/1963 | Collins et al. | 428/374 |
| 3,411,911 | 11/1968 | Dykstra | 430/535 |
| 3,681,070 | 8/1972 | Timmerman et al. | 430/62 |
| 4,002,802 | 1/1977 | Bayless et al. | 428/483 |
| 4,135,932 | 1/1979 | Mann | 430/535 |
| 4,147,550 | 4/1979 | Campbell et al. | 430/529 |
| 4,252,885 | 2/1981 | McGrail et al. | 430/534 |

*Primary Examiner*—Won H. Louie, Jr.

*Attorney, Agent, or Firm*—Cushman, Darby & Cushman

[57] ABSTRACT

A coated film base suitable for coating with a light-sensitive photographic emulsion layer comprises a self-supporting film of a synthetic linear polyester and a continuous subbing layer applied to at least one surface of said self-supporting film comprising a water-insoluble copolymer of (a) styrene or a derivative of styrene, (b) a comonomer selected from acrylic acid, methacrylic acid or a derivative of acrylic acid or methacrylic acid and (c) a copolymerizable sulphonated ethylenically unsaturated comonomer having the general structure:

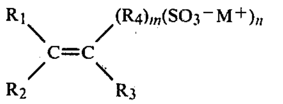

wherein $R_1$, $R_2$ and $R_3$ are the same or different and represent hydrogen, halogen, alkyl, nitrile, amide, amine, ketone, ethyl or vinyl;

$R_4$ represents alkylene, carbonyl, naphthylene, substituted naphthylene or vinylene;

M represents hydrogen, ammonium, substituted ammonium or an alkali metal and is preferably lithium, potassium or sodium;

m represents 1 or 0;

n represents an integer 1, 2 or 3 provided that $n=1$ when $m=0$, said comonomers (a), (b) and (c) being present in the respective molar percentages in the ranges (a) 33.3 to 90%, (b) 5 to 65% and (c) 1 to 40%. The subbing layer renders the coated film base anti-static. Photographic emulsions adhere strongly to the subbing layer which is preferably subjected to corona discharge treatment before the application of the emulsion.

5 Claims, No Drawings

PHOTOGRAPHIC FILM BASES

The present invention relates to a coated photographic film base suitable for coating with a light-sensitive photographic emulsion, to a light-sensitive photographic film comprising a light-sensitive photographic emulsion applied to the coated film base and to processes for the production of the film base and the light-sensitive photographic film.

It is known in the photographic art that light-sensitive photographic emulsions, such as conventional light-sensitive gelatinous silver halide emulsions, do not adhere readily to the surfaces of supports derived from thermoplastics films, such as films of synthetic linear polyesters. It has therefore become common practice in the art to improve the adhesion between the film support and the photographic emulsions by pretreating the surface of the film support prior to the application of the photographic emulsion, for example, by coating with one or more polymeric adhesion-promoting layers and optionally with a further adhesion-promoting gelatinous layer. Such layers are often termed subbing layers. GB Pat. No. specification 1 540 067 describes light-sensitive photographic films comprising subbing layers derived from polymers of styrene and/or derivatives of styrene, Example 11 thereof describing a subbing copolymer of styrene/butyl acrylate/itaconic acid (70/25/5 mole %).

It is also desirable that light-sensitive photographic films and film bases for their production should have anti-static properties such that they resist the accumulation of electrostatic charges which introduce one or more of several disadvantages such as poor handling properties and feeding through coating machines, fogging of the light-sensitive photographic emulsion, surface contamination by the attraction of dirt particles and a fire or explosion hazard especially in solvent-laden atmospheres.

The present invention relates to a subbing copolymer which is effective in promoting the adhesion of a light-sensitive photographic emulsion to a film support of a synthetic linear polyester and also has anti-static properties.

According to the present invention a coated film base suitable for coating with a light-sensitive photographic emulsion layer comprises a self-supporting film of a synthetic linear polyester and a continuous subbing layer applied to at least one surface of said self-supporting film comprising a water-insoluble copolymer of (a) styrene or a derivative of styrene, (b) a comonomer selected from acrylic acid, methacrylic acid or a derivative of acrylic acid or methacrylic acid and (c) a copolymerisable sulphonated ethylenically unsaturated comonomer having the general structure:

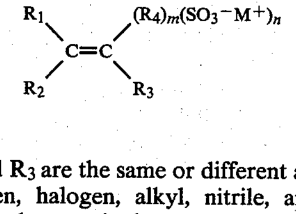

wherein

- $R_1$, $R_2$ and $R_3$ are the same or different and represent hydrogen, halogen, alkyl, nitrile, amide, amine, ketone, ether or vinyl;
- $R_4$ represents alkylene, carbonyl, naphthylene, substituted naphthylene or vinylene;
- M represents hydrogen, ammonium, substituted ammonium or an alkali metal and is preferably lithium, potassium or sodium;
- m represents 1 or 0;
- n represents an integer 1, 2 or 3 provided that $n=1$ when $m=0$, said comonomers (a), (b) and (c) being present in the respective molar percentages in the ranges (a) 33.3 to 90%, (b) 5 to 65% and (c) 1 to 40%.

According to another aspect of the invention, a light-sensitive photographic film comprises a light-sensitive photographic emulsion layer applied directly or indirectly to the subbing layer of the coated film base defined in the preceding paragraph.

The invention also relates to a process for the production of a coated film base in which at least one surface of a self-supporting film of a synthetic linear polyester is coated with a film-forming composition of said water-insoluble copolymer and the composition is dried into a continuous subbing layer.

Accordingly, a process for the production of a coated film base comprises applying a continuous subbing layer to at least one surface of a self-supporting film of a synthetic linear polyester, said subbing layer being applied from a film-forming composition comprising a water-insoluble copolymer of (a) styrene or a derivative of styrene, (b) a comonomer selected from acrylic acid, methacrylic acid or a derivative of acrylic acid or methacrylic acid and (c) a copolymerisable sulphonated ethylenically unsaturated comonomer having the general structure:

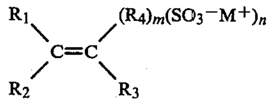

wherein

- $R_1$, $R_2$ and $R_3$ are the same or different and represent hydrogen, halogen, alkyl, nitrile, amide, amine, ketone, ether or vinyl;
- $R_4$ represents alkylene, carbonyl, naphthylene, substituted naphthylene or vinylene;
- M represents hydrogen, ammonium, substituted ammonium or an alkli metal and is preferably lithium, potassium or sodium;
- m represents 1 or 0;
- n represents an integer 1, 2 or 3 provided that $n=1$ when $m=0$, said comonomers (a), (b) and (c) being present in the respective molar percentages in the ranges (a) 33.3 to 90%, (b) 5 to 65% and (c) 1 to 40%.

In another aspect of the invention, a process for the production of a light-sensitive photographic film comprises applying a light-sensitive photographic emulsion layer directly or indirectly to the subbing layer applied to the self-supporting film in the process defined in the preceding paragraph.

The subbing copolymer may be derived from one or more comonomers falling within the definitions of each of the comonomers (a), (b) and (c).

The self-supporting film may be produced from any suitable synthetic linear polyester which may be obtained by condensing one or more dicarboxylic acids or their lower alkyl diesters, e.g. terephthalic acid, isophthalic, phthalic, 2,5-, 2,6- and 2,7-naphthalene dicarboxylic acid, succinic acid, sebacic acid, adipic acid, azelaic acid, diphenyl dicarboxylic acid, and hexahydroterephthalic acid or bis-p-carboxyl phenoxy ethane, optionally with a monocarboxylic acid, such as pivalic acid, with one or more glycols, e.g. ethylene glycol, 1,3-propanediol, 1,4-butanediol, neopentyl glycol and 1,4-cyclohexanedimethanol. Polyethylene terephthalate films are particularly preferred especially those films which have been biaxially oriented by stretching in sequence in two mutually perpendicular directions typically at temperatures in the range 78° to 125° C. and heat set typically at temperatures in the range 150° to 250° C., e.g. as described in GB patent specification 838 708.

The copolymers of the subbing composition are essentially water-insoluble. It will be appreciated that water-soluble copolymers would be dissolved by the aqueous solutions which are normally used for photographic processing, e.g. for development and fixing, thereby destroying the adhesion of the superimposed light-sensitive photographic emulsion layer to the underlying polyester film. The subbing compositions including the water-insoluble copolymers may nevertheless be applied to the polyester film as aqueous dispersions or alternatively as solutions in organic solvents.

Styrene derivatives suitable for use as comonomer (a) in the production of the subbing copolymer preferably comprise chloro-styrene, hydroxy styrene and alkylated styrenes. It is preferred however that comonomer (a) should be unsubstituted styrene.

The styrene and/or styrene derivative comonomer is desirably although not essentially the major single monomeric constituent of the copolymer, i.e. the molar proportion of styrene and/or the styrene derivative must exceed the molar proportion of each other comonomer.

Comonomer (b) for the subbing copolymer is preferably present in an amount 5 to 40 mole % and preferably comprises an ester of acrylic acid or methacrylic acid, especially an alkyl ester wherein the alkyl group contains up to ten carbon atoms such as methyl, ethyl, n-propyl, isopropyl, n-butyl, isobutyl, tertbutyl, hexyl, 2-ethyl, hexyl, heptyl and n-octyl. Copolymers derived from butyl esters especially n-butyl acrylate have been found to provide especially effective properties. Lower amounts of comonomer (b), e.g. less than 20 mole %, may provide insufficient internal plasticisation of the subbing copolymer to render it film-forming. In such cases, a plasticiser may be included as an additive in the subbing composition.

Other comonomers falling within the definition of comonomer (b) which are suitable for use in the preparation of the subbing copolymer which may be used instead of but are preferably copolymerised as optional additional comonomers together with acrylic acid or methacrylic acid or esters of the acids include acrylonitrile, methacrylonitrile, halo-substituted acrylonitrile, halo-substituted methacrylonitrile, acrylamide, methacrylamide, N-methylol acrylamide, N-ethanol acrylamide, N-propanolacrylamide, N-methylol methacrylamide, N-ethanol methacrylamide, N-methyl acrylamide, N-tertiary butyl acrylamide, hydroxyethyl methacrylate, glycidyl acrylate, glycidyl methacrylate, dimethylamino ethyl methacrylate, itaconic acid, itaconic anhydride and half esters of itaconic acid.

Comonomer (c) which provides anti-static protection for the subbing layer is preferably present in an amount 5 to 35 mole % and preferably comprises a salt and most preferably an alkali metal salt, e.g. a sodium salt. Particularly effective salts are the salts of vinyl sulphonic acid, allyl sulphonic acid and methallyl sulphonic acid, preferably sodium salts thereof.

Comonomers which function to modify the properties of the subbing layer may optionally be included in the production of the subbing copolymer, such as comonomers which promote the adhesion of the subbing layer in the wet and dry state to the polyester film and/or to superimposed light-sensitive photographic emulsion layers especially those comprising gelatin.

Itaconic acid and itaconic anhydride are particularly effective comonomers in promoting tenacious adhesion to superimposed gelatin-containing layers and are a preferred comonomer according to this invention. Itaconic acid may be copolymerised in an amount comprising up to 20 mole % of the total comonomeric formulation and preferably in the range 2 to 10 mole %.

The adhesion of the subbing layer to the polyester film may be modified by including one or more comonomers having cross-linkable functional groups in the comonomeric recipe for the formation of the subbing copolymer. Epoxy group-containing comonomers, such as glycidyl acrylate and glycidyl methacrylate, are particularly effective in providing internal cross-linking within the subbing layer and possibly also cross-linking to the polyester film. A comonomeric amount of 5 to 25 mole %, preferably 15 to 25 mole %, of glycidyl acrylate or glycidyl methacrylate is effective in providing the desired adhesion properties.

Other optional comonomers include vinyl esters, such as vinyl acetate, vinyl chloracetate and vinyl benzoate, vinyl pyridine, vinyl chloride, vinylidene chloride, maleic acid, maleic anhydride and butadiene.

Particularly preferred subbing copolymers for use according to this invention are copolymers of 40 to 65 mole % styrene, 15 to 25 mole % of an alkyl acrylate and/or alkyl methacrylate, e.g. butyl acrylate, 10 to 20 mole % of a salt, e.g. a sodium salt, of vinyl sulphonic acid, 0 to 10 mole % of itaconic acid and 0 to 20 mole % of glycidyl acrylate or glycidyl methacrylate.

Conventional additives may be included in the subbing layer, e.g. adhesion promoters, such as a partially hydrolysed vinyl acetate/vinyl chloride copolymer optionally admixed with a chlorinated phenol, and particulate fillers for providing slip properties.

If desired, the subbing composition may also contain a cross-linking agent which functions to cross-link the subbing copolymer thereby improving adhesion to the polyester film. Additionally, the cross-linking agent should preferably be capable of internal cross-linking in order to provide protection against solvent penetration. Suitable cross-linking agents may comprise epoxy resins, alkyd resins, amine derivatives such as hexamethoxymethyl melamine, and/or condensation products of an amine, e.g. melamine, diazine, urea, cyclic ethylene urea, cyclic propylene urea, thiourea, cyclic ethylene thiourea, alkyl melamines, aryl melamines, benzo guanamines, guanamines, alkyl guanamines and aryl guanamines, with an aldehyde, e.g. formaldehyde. A useful condensation product is that of melamine with formaldehyde. The condensation product may optionally be alkoxylated. The cross-linking agent may be used in amounts of up to 25% by weight based on the weight of the copolymer in the subbing composition. A catalyst is also preferably employed to facilitate cross-linking action of the cross-linking agent. Preferred catalysts for cross-linking melamine formaldehyde include ammonium chloride, ammonium nitrate, ammonium thiocyanate, ammonium dihydrogen phosphate, ammonium sulphate, diammonium hydrogen phosphate, para toluene sulphonic acid, maleic acid stabilised by reaction with a base, and morpholinium para toluene sulphonate.

The subbing composition may be applied to the polyester film as an aqueous dispersion or a solution in an organic solvent by any suitable conventional coating technique such as dip coating, bead coating, reverse roller coating or slot coating.

The subbing composition may be applied to the polyester film during or after the completion of the process by which the polyester film is produced.

If the subbing composition is applied to the film after the production of the film has been completed, the film may be pretreated or coated in such a way to improve the adhesion of the subbing layer to the film surface. Conventional chemical or physical pretreatments such as coating the film surface with a solution having an etching, swelling, solvent or oxidising action on the film, corona discharge treatment, flame treatment, or ultra-violet light treatment may be used. Alternatively, the plastics film may carry an adhesion-promoting polymeric layer to which the subbing layer according to the invention may be applied.

It has been found however that the subbing compositions bond with acceptable adhesion to the polyester film surface when applied to the film during the process for its manufacture. Satisfactory adhesion is obtainable by direct application of the subbing composition to the polyester film surface without any pretreatment or interposition of an adhesion-promoting layer.

Polyester films are normally manufactured by a process wherein the films are molecularly oriented by stretching in two mutually perpendicular directions. The process is conventionally accomplished by sequentially stretching a flat amorphous polyester film first in one direction and then in another mutually perpendicular direction. Generally, it is preferred to stretch the film firstly in the longitudinal direction, i.e. the direction of passage through the stretching machine, and then in the transverse direction. The stretched films may also be dimensionally stabilised by heat-setting under dimensional restraint. Stretching and heat setting is conventionally carried out by heating the film above the glass-transition temperature and below the melting temperature of the film. The preferred polyester films for use according to the invention may be made according to such a process. Polyethylene terephthalate films are preferably produced by sequential biaxial orientation and heat setting, e.g. as described in GB patent specification No. 838 708.

Polyester films oriented by sequential stretching may be coated with the subbing composition either before stretching in the first direction of stretching, at a stage intermediate the stretching in the first direction and stretching in the second direction, or after stretching has been completed and either before or after heat setting. It is preferred according to this invention that the subbing composition should be applied to the film between the two stretching operations, e.g. by firstly stretching the film in the longitudinal direction over a series of rotating rollers, coating with the subbing composition and then stretching transversely in a stenter oven followed by heat-setting.

Subbing compositions applied to the polyester film surface during the production of the film are preferably applied as aqueous dispersions. The temperatures applied to the coated film during the subsequent stretching and/or heat setting are effective in drying the aqueous medium, or the solvent in the case of solvent-applied compositions, and also in coalescing and forming the coating into a continuous and uniform subbing layer. The cross-linking of cross-linkable subbing compositions is also achieved at such stretching and/or heat-setting temperatures.

The subbing layer is preferably applied to the polyester film at a coat weight within the range 0.1 to 10 $mg/dm^2$, especially 1.0 to 3.0 $mg/dm^2$. For films coated on both surfaces with a subbing layer, each layer preferably has a coat weight within the preferred range.

According to one aspect of this invention, a light-sensitive photographic emulsion layer, e.g. a conventional X-ray or graphic arts gelatinous silver halide emulsion, may be adhered directly or indirectly to the subbing layer. Indirect adhesion may be accomplished by interposing a conventional gelatinous subbing layer between the copolymeric subbing layer and the light-sensitive photographic emulsion layer. However, it has been discovered that adequate wet and dry adhesion can be obtained in the absence of a gelatinous subbing layer and by adhering the light-sensitive photographic emulsion layer directly to the copolymeric subbing layer. Modification of the surface of the copolymeric subbing layer, e.g. by flame treatment, ion bombardment, electron beam treatment, ultra-violet light treatment or preferably by corona discharge, has been found to promote the adhesion of a light-sensitive photographic emulsion layer applied directly to the copolymeric subbing layer.

The preferred treatment by corona discharge may be effected in air at atmospheric pressure with conventional equipment using a high frequency, high voltage generator, preferably having a power output of from 1 to 20 kw at a potential of 1 to 100 kv. Discharge is conveniently accomplished by passing the film over a dielectric support roller at the discharge station at a linear speed preferably of 1.0 to 500 m per minute. The discharge electrodes may be positioned 0.1 to 10.0 mm from the moving film surface.

The light-sensitive photographic emulsion may optionally include any of the conventional additives.

The coated film bases according to this invention have excellent anti-static properties such that they pass effectively and without interruption through coating machines, e.g. for the application of light-sensitive photographic emulsions. Light-sensitive photographic emulsion layers applied directly or indirectly to the subbing layer of the coated film bases adhere with excellent dry and wet adhesions.

The invention is further illustrated by the following examples, in which dry and wet adhesions have the following meanings and were assessed by the following tests.

Dry adhesion refers to the adhesion of a gelatinous silver halide emulsion to the plastics film in the final photographic film, assessed, both before and after processing in standard photographic chemicals, by sticking a self-adhesive tape along the torn edge of the film and rapidly separating the tape from the film.

Wet adhesion refers to the adhesion of a gelatinous silver halide emulsion to the plastics film in the final photographic film, assessed, after processing in the standard photographic chemicals and washing in water for 15 minutes by rubbing with a sponge over a series of lines scored in the still wet emulsion.

EXAMPLE 1

An aqueous dispersion of a styrene/n-butyl acrylate/itaconic acid/sodium methallyl sulphonate copolymer of the respective proportions 60/25//5/10 mole % was prepared by conventional emulsion polymerisation of the following ingredients:

| | |
|---|---|
| Styrene | 113 ml |
| n-butyl acrylate | 59 ml |
| Sodium methallyl sulphonate | 25.7 g |
| Itaconic acid | 10.7 g |
| 'Nansa' 1106 (sodium alkyl benzene sulphone - commercially available from Albright & Wilson) | 20 ml |
| Potassium persulphate | 2 g |
| Distilled water | 825 ml |

A subbing composition was produced from the resulting aqueous dispersion as a mixture of the ingredients:

| | |
|---|---|
| Styrene/n-butyl acrylate/itaconic acid/sodium methallyl sulphonate copolymer dispersion | 10 g |
| Hexamethoxy methyl melamine (commercially available as 'Cymel' 300) | 1 g |
| Distilled water | 89 g |

A polyethylene terephthalate film was melt extruded, cast onto a coated rotating drum and stretched in the direction of extrusion to about three times its original dimension in that direction by conventional procedure and was coated on both sides with a uniform layer of the aqueous subbing composition. The coated film was passed into a heated stenter oven where the coatings were dried and the film stretched about three times its original dimension in the transverse direction in a conventional manner. The film was then heat set under dimensional restraint at a temperature of about 200° C. by conventional procedure. The applied subbing layers were formed into uniform continuous layers each having a dry coat weight of approximately 1.5 mg/dm$^2$ and the film had an overall thickness of about 100 μm.

The subbing layers were subjected to corona discharge treatment by passing the film at 6.1 meters per minute through a commercially available 'Vetaphone' 3 kw treater using a power of 2 kw and an electrode to film distance of 1 mm. The corona discharge treated surfaces had a wetting test value determined by the Union Carbide Standard Wetting Test (WC 81-3/1964) with a formamide/'Cellosolve' mixture exceeding 56 dynes/cm.

The corona discharge-treated subbing layers were then coated with a conventional silver halide X-ray emulsion which was chilled to gel the coating and dried for 20 minutes at 33° C. The dry and wet adhesions of the silver halide emulsion layers to the polyethylene terephthalate film were determined by the tests noted above and were found to be strong and acceptable for photographic use.

The subbed film was found to have excellent antistatic properties when tested at a temperature of 20° C. and a relative humidity of 60% after corona discharge treatment and before the application of the silver halide emulsion layers, i.e. a surface resistivity of $5 \times 10^{10}$ ohms/square.

EXAMPLES 2 TO 7

Example 1 was repeated using similar aqueous dispersions but containing different subbing copolymers as shown in the following Table. For Examples 2 and 6 only, the subbing composition also included 0.1 g of ammonium nitrate. For Example 7 only, the hexamethoxy methyl melamine was omitted from the subbing composition.

In each case the dry and wet adhesions of the silver halide emulsion layers to the polyethylene terephthalate film were assessed by the tests noted above and were found to be strong and acceptable for photographic use.

The subbed films were found to have excellent antistatic properties, represented by the surface resistivities noted in the Table when measured at a temperature of 20° C. and a relative humidity of 60%.

TABLE

| Example | Comonomers for preparation of subbing copolymer | Respective proportions of comonomers in subbing copolymer mole % | Surface resistivity of subbed film measured at 20° C. and 60% relative humidity ohms/square |
|---|---|---|---|
| 1 | S/BA/IA/SMS | 60/25/5/10 | $5 \times 10^{10}$ |
| 2 | S/BA/SVS | 61/25.5/13.5 | $5 \times 10^{9}$ |
| 3 | S/BA/IA/SVS | 50/21/9.5/19.5 | $1 \times 10^{9}$ |
| 4 | S/BA/AA/SVS | 50/21/9.5/19.5 | $1 \times 10^{9}$ |
| 5 | S/BA/GMA/SAS | 50/21/19/10 | $4 \times 10^{10}$ |
| 6 | S/BA/GMA/IA/SVS | 45/19/17/4/15 | $3 \times 10^{9}$ |
| 7 | S/BA/GMA/IA/SVS | 45/19/17/4/15 | $3 \times 10^{9}$ |

Key:
S = styrene
BA = n-butyl acrylate
IA = itaconic acid
AA = acrylic acid
GMA = glycidyl methacrylate
SVS = sodium vinyl sulphonate
SMS = sodium methallyl sulphonate
SAS = sodium allyl sulphonate

We claim:

1. A coated film base suitable for coating with a light-sensitive photographic emulsion layer, said base comprising a self-supporting film of a synthetic linear polyester and a continuous subbing layer applied to at least one surface of said self-supporting film, wherein the subbing layer consists essentially of:
   (1) a water-insoluble copolymer of:
      (a) 33.3 to 90 mole % of styrene, its molar proportion in the copolymer exceeding the molar proportion of each other comonomer;
      (b) 5 to 40 mole % of a butyl ester of acrylic or methacrylic acid;
      (c) 5 to 35 mole % of an alkali metal salt of vinyl sulphonic acid, allyl sulphonic acid or methallyl sulphonic acid;
      (d) 0 to 10 mole % of acrylic, methacrylic or itaconic acid, a half-ester of itaconic acid, or itaconic anhydride; and
      (e) 0 to 25 mole % of glycidyl acrylate or glycidyl methacrylate; and
   (2) 0 to 25% by weight, based on the weight of the copolymer, of a cross-linking agent which comprises a condensation product of an amine with formaldehyde.

2. A coated film base according to claim 1, in which comonomer (b) for the subbing copolymer comprises n-butyl acrylate.

3. A coated film base according to claim 1, in which the subbing copolymer comprises 40 to 65 mole % of styrene, 15 to 25 mole % of butyl acrylate and/or butyl methacrylate, 10 to 20 mole % of a salt of vinyl sulphonic acid, 0 to 10 mole % of itaconic acid and 0 to 20 mole % of glycidyl acrylate or glycidyl methacrylate.

4. A coated film base according to claim 1, in which the subbing copolymer has been cross-linked.

5. A light-sensitive photographic film which comprises a light-sensitive photographic emulsion layer applied directly or indirectly over the subbing layer of the coated film base claimed in claim 1.

* * * * *